US011502539B2

United States Patent
Seki et al.

(10) Patent No.: US 11,502,539 B2
(45) Date of Patent: Nov. 15, 2022

(54) DC/DC CONVERTER SYSTEM AND PHOTOVOLTAIC SYSTEM

(71) Applicant: TOSHIBA MITSUBISHI-ELECTRIC INDUSTRIAL SYSTEMS CORPORATION, Chuo-ku (JP)

(72) Inventors: Kosuke Seki, Tokyo (JP); Tatsuaki Ambou, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/284,613

(22) PCT Filed: Jun. 20, 2019

(86) PCT No.: PCT/JP2019/024572
§ 371 (c)(1),
(2) Date: Apr. 12, 2021

(87) PCT Pub. No.: WO2020/255351
PCT Pub. Date: Dec. 24, 2020

(65) Prior Publication Data
US 2021/0344216 A1 Nov. 4, 2021

(51) Int. Cl.
*H02J 7/35* (2006.01)
*H02J 3/32* (2006.01)
*H02J 3/38* (2006.01)

(52) U.S. Cl.
CPC ...... *H02J 7/35* (2013.01); *H02J 3/32* (2013.01); *H02J 3/381* (2013.01); *H02J 2300/26* (2020.01)

(58) Field of Classification Search
CPC ...... H02J 7/35; H02J 3/32; H02J 3/381; H02J 2300/26; Y02E 10/56; Y02E 70/30
See application file for complete search history.

(56) References Cited

U.S. PATENT DOCUMENTS

2015/0009733 A1  1/2015 Takaki
2017/0222441 A1* 8/2017 Chen ................ H02J 3/381
(Continued)

FOREIGN PATENT DOCUMENTS

JP    8-126211 A    5/1996
JP    2011-151960 A  8/2011
(Continued)

OTHER PUBLICATIONS

International Search Report dated Aug. 6, 2019 in PCT/JP2019/024572 filed on Jun. 20, 2019, 2 pages.

*Primary Examiner* — Toan T Vu
(74) *Attorney, Agent, or Firm* — Oblon, McClelland, Maier & Neustadt, L.L.P.

(57) ABSTRACT

A DC/DC converter system includes a current sensor sensing a current flowing from a photovoltaic panel to a power converter device, and a DC/DC converter provided between a battery facility and the power converter device and configured to convert first DC power output from the battery facility into second DC power. The DC/DC converter includes a first operation mode in which the second DC power is generated to allow an output current and an output voltage to simulate the photovoltaic-cell current-voltage characteristics according to a current value sensed with the current sensor. The DC/DC converter may also include a second operation mode executing a boost operation of increasing a potential at a connection node, and a third operation mode in which a voltage at the connection node is converted to charge the battery facility. The DC/DC converter can selectively switch among the first, second, and third operation modes.

7 Claims, 2 Drawing Sheets

(56) References Cited

U.S. PATENT DOCUMENTS

2018/0090981 A1* 3/2018 Yamaguchi ............... H02J 3/32
2019/0190400 A1* 6/2019 Vanderzaden .......... H02J 3/381

FOREIGN PATENT DOCUMENTS

| JP | 2013-161139 A | 8/2013 |
| JP | 2014-168348 A | 9/2014 |
| JP | 2017077124 * | 4/2017 |
| JP | 6458891 B1 | 1/2019 |
| JP | 6475945 B2 | 2/2019 |

* cited by examiner

DC/DC CONVERTER SYSTEM AND PHOTOVOLTAIC SYSTEM

FIELD

The present application relates to a DC/DC converter system applicable to a photovoltaic system.

BACKGROUND

Conventionally, a photovoltaic system constructed as a DC-link system is known as disclosed in JP 6475945 B, for example. As described in paragraph 0024 of the patent literature, a DC-link system is a system for linking power from photovoltaic cells or a storage battery, for example, as DC power and converting it into AC power using a single inverter.

CITATION LIST

Patent Literature

[PTL 1] JP 6475945 B

SUMMARY

Technical Problem

Conventionally, to provide the aforementioned conventional DC-link system, photovoltaic cells, a power converter device, and a DC/DC converter are originally designed as a single system. Meanwhile, a technique of adding a DC/DC converter to a non-DC-link photovoltaic system, which is not originally designed as a DC-link system, is not common. This is because there have been problems such as the necessity to make complex design changes to both hardware and software. Examples of such problematic design changes include adding a communication line and a sensor and changing the control to be performed to enable cooperative control with a higher-order system.

The present application has been made to solve the aforementioned problems, and it is an object of the present application to provide a DC/DC converter system that can be easily added to a photovoltaic system, and a photovoltaic system including such a DC/DC converter system.

Solution to Problem

A DC/DC converter system according to the present application includes current sensing means for sensing a current to flow from a photovoltaic panel to a power converter device; and a DC/DC converter device provided between a battery facility and the power converter device and configured to convert first DC power output from the battery facility into second DC power and output the second DC power to the power converter device, the DC/DC converter device including a first operation mode in which, when it is detected that the photovoltaic panel is not generating power from a current value sensed with the current sensing means, the second DC power is generated so as to allow an output current and an output voltage to change according to a predetermined photovoltaic-cell current-voltage simulation characteristic curve.

A photovoltaic system according to the present application includes a photovoltaic panel; a reverse-current blocking diode that receives at an anode DC power from the photovoltaic panel; a power converter device that receives the DC power from a cathode of the reverse-current blocking diode; current sensing means for sensing a current to flow from the photovoltaic panel to the power converter device via the reverse-current blocking diode; a battery facility; and a DC/DC converter device connected to a connection node between the cathode of the reverse-current blocking diode and the power converter device, the DC/DC converter device being configured to convert first DC power output from the battery facility into second DC power and output the second DC power to the connection node, the DC/DC converter device including a first operation mode in which, when it is detected that the photovoltaic panel is not generating power from a current value sensed with the current sensing means, the second DC power is generated so as to allow an output current and an output voltage to change according a predetermined photovoltaic-cell current-voltage simulation characteristic curve.

Advantageous Effects of Invention

According to the present application, the DC/DC converter device operates according to a photovoltaic-cell current-voltage simulation characteristic curve that has been determined in advance to simulate the photovoltaic panel. Therefore, the DC/DC converter device can be handled from the side of the power converter device in the same way as when another photovoltaic panel is added. This allows the DC/DC converter system to be easily added to a photovoltaic system.

DESCRIPTION OF EMBODIMENTS

Figure 1:
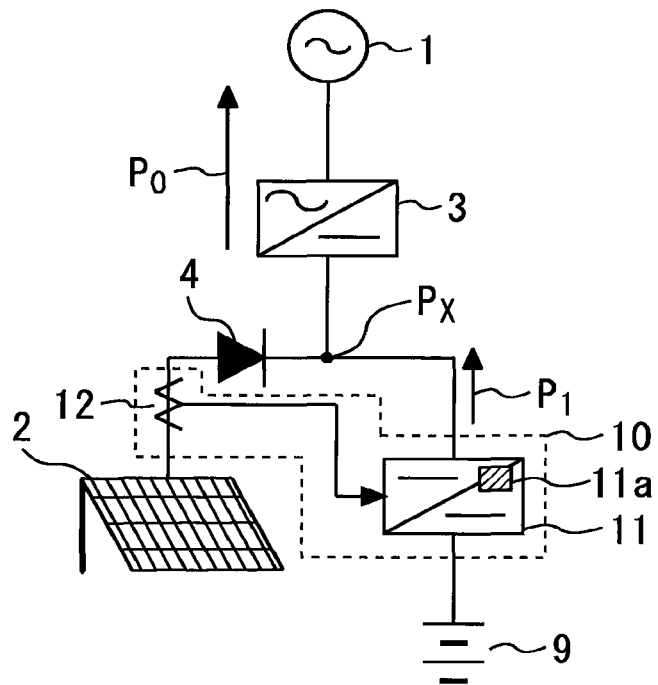
FIG. 1 is a diagram illustrating the configurations of a DC/DC converter system and a photovoltaic system according to an embodiment.

FIG. 1 is a diagram illustrating the configurations of a DC/DC converter system 10 and a photovoltaic system according to an embodiment. The photovoltaic system in FIG. 1 is grid-connected to a power system 1.

The photovoltaic system in FIG. 1 includes a photovoltaic array 2, a power converter device 3, a reverse-current blocking diode 4, a battery facility 9, and the DC/DC converter system 10. The arrow P0 in FIG. 1 represents site resultant power. The site resultant power P0 is the total value of the output power of the photovoltaic array 2 and that of the battery facility 9 in the photovoltaic system.

The photovoltaic array 2 has a plurality of photovoltaic panels arranged therein. Although FIG. 1 illustrates a single photovoltaic array 2 for convenience sake, the actual photovoltaic system may have a plurality of photovoltaic arrays 2 connected in parallel or series.

The power converter device 3 converts DC power generated by the photovoltaic array 2 into AC power. Specifically, the power converter device 3 includes an inverter circuit and an inverter control circuit for controlling the inverter circuit. The inverter circuit includes a plurality of switching devices, such as IGBTs. The inverter control circuit generates a pulse-width modulated signal as a gate drive signal for the switching devices. The power converter device 3 is also referred to as a power conditioning system (PCS).

The power converter device 3 is configured to perform known maximum power point tracking (MPPT) control. MPPT control is a control function of extracting a current at an output voltage that can maximize power from the photovoltaic array 2. The power converter device 3 is preferably also provided with an output limiter function.

The anode of the reverse-current blocking diode 4 is connected to the photovoltaic array 2. The power converter device 3 is connected to the cathode of the reverse-current blocking diode 4. In this embodiment, no other DC/DC converters are serially inserted into a series circuit between the photovoltaic array 2 and the power converter device 3 as illustrated in FIG. 1. This point is one of the differences between the system according to this embodiment and the system illustrated in FIG. 1 and the like of JP 6475945 B.

The battery facility 9 includes a chargeable and dischargeable storage battery body, and a battery management system that manages the storage battery body in terms of SOC (State of Charge), for example. The storage battery body of the battery facility 9 may be, for example, a cell stack or a battery selected from the group consisting of a fuel cell stack, a lithium ion battery, a lead storage battery, and a sodium-sulfur battery, though the type of the storage battery body is not limited thereto. It should be noted that the output characteristics of the storage battery body are determined by its structure and material. For example, the output characteristics may be such that a current and a voltage are inversely proportional, or at least one of an output current and an output voltage decreases with a change in SOC.

The DC/DC converter system 10 includes a DC/DC converter 11 and a current sensor 12. The cathode of the reverse-current blocking diode 4 and the power converter device 3 are connected via a DC bus. The DC/DC converter 11 is connected to a connection node Px between the cathode of the reverse-current blocking diode 4 and the power converter device 3. The DC/DC converter 11 is provided between the battery facility 9 and the power converter device 3. It should be noted that the power converter device 3 and the DC/DC converter 11 may individually execute control without communicating with each other. Thus, a communication line need not be provided between the power converter device 3 and the DC/DC converter 11.

The DC/DC converter 11 is a DC/DC converter device configured to step-up or step-down a DC voltage. The DC/DC converter 11 includes a converter circuit, a converter control unit 11a, a first current-voltage sensor that measures a current and a voltage received from or output to the battery facility 9, and a second current-voltage sensor that measures a current and a voltage received from or output to the connection node Px. Herein, illustration of the converter circuit, the first current-voltage sensor, and the second current-voltage sensor is omitted. Examples of the converter circuit include a step-up/down converter circuit having a combination of a boost chopper circuit and a buck chopper circuit. The converter control unit 11a provides a drive signal (i.e., a gate pulse) to each of semiconductor switching devices of the boost chopper circuit and the buck chopper circuit based on currents and voltages measured with the first current-voltage sensor and the second current-voltage sensor so that an output value designated by a command value is achieved. The converter control unit 11a includes a known step-up/down control logic, which may include, for example, one or more of constant current control that is based on a target current command value $I_{out}^*$, constant voltage control that is based on a target voltage command value $V_{out}^*$, and constant power control that is based on a target power command value $P_{out}^*$. The DC/DC converter 11 is configured to be capable of selectively executing a discharge operation or a charge operation. The discharge operation is the operation of discharging power stored in the battery facility 9 to the connection node Px. The charge operation is the operation of charging the battery facility 9 by taking in power from the connection node Px.

The DC/DC converter 11 converts first DC power output from the battery facility 9 into second DC power and outputs it to the power converter device 3 according to a command value. In addition, the current sensor 12 senses a current to flow from the photovoltaic array 2 to the power converter device 3 via the reverse-current blocking diode 4.

The operation mode of the DC/DC converter 11 includes a "first operation mode". The first operation mode is a mode in which the second DC power is output so as to allow an output current and an output voltage to simulate the photovoltaic-cell current-voltage characteristics. In the first operation mode, the DC/DC converter 11 operates so as to simulate the power generation characteristics of the photovoltaic array 2 according to a "predetermined photovoltaic-cell current-voltage simulation characteristic curve Sr1". Consequently, the DC/DC converter 11 as seen from the power converter device 3 can be handled in the same way as when another photovoltaic array is simply additionally connected in parallel. This allows the DC/DC converter system 10 to be added easily.

The advantageous effects of the DC/DC converter system 10 according to this embodiment will be described in further detail. According to this embodiment, the DC/DC converter 11 can be easily added to a non-DC-link photovoltaic system that is not originally designed as a DC-link system.

It would be advantageous to originally design a DC-link system as a single system as such a design allows the system configurations (i.e., a photovoltaic array, a battery facility, a DC/DC converter, and a power converter device) to be developed and designed concurrently and thus can provide flexibility for both hardware design and software design.

In contrast, a technique of adding the DC/DC converter 11 to a non-DC-link photovoltaic system, which is not originally designed as a DC-link system, is not common. This is because enormous design changes should be made to both hardware and software. Examples of such design changes include adding a communication line and a sensor and changing the design to enable cooperative control with a higher-order system. Due to such circumstances, it has been practically impossible to add the DC/DC converter 11 to a non-DC-link system.

According to this embodiment, the DC/DC converter 11 can be easily applied to a photovoltaic system including the photovoltaic array 2 and the power converter device 3. The hardware configuration of this embodiment is obtained by connecting the DC/DC converter 11 in parallel with the DC bus after the reverse-current blocking diode 4 is inserted thereto on the side of the photovoltaic array 2. The current sensor 12 is also provided for the DC/DC converter 11 to grasp the power generation status of the photovoltaic array 2.

Such a configuration allows the DC/DC converter 11 to be added without the need to change the hardware or software configuration on the side of the photovoltaic array 2 or the power converter device 3. Consequently, cost and lead time of the power converter device 3 can be reduced. Further, since the DC/DC converter 11 does not depend on the hardware or software configuration of the photovoltaic array 2 or the power converter device 3, the DC/DC converter 11 can also be applied to photovoltaic systems of other companies that include the photovoltaic array 2.

The control executed by the DC/DC converter 11 in the DC/DC converter system 10 according to this embodiment will be described in further detail. In this embodiment, a first operation mode, a second operation mode, and a third operation mode are provided.

(First operation mode) The first operation mode is an operation mode performed when the photovoltaic array 2 is not generating power. In the first operation mode, discharged power is released in the direction of the arrow P1 in FIG. 1, and the discharged power changes according to a current-voltage characteristic curve S1. That is, the first operation mode is a "PV simulation operation mode".

Figure 2:
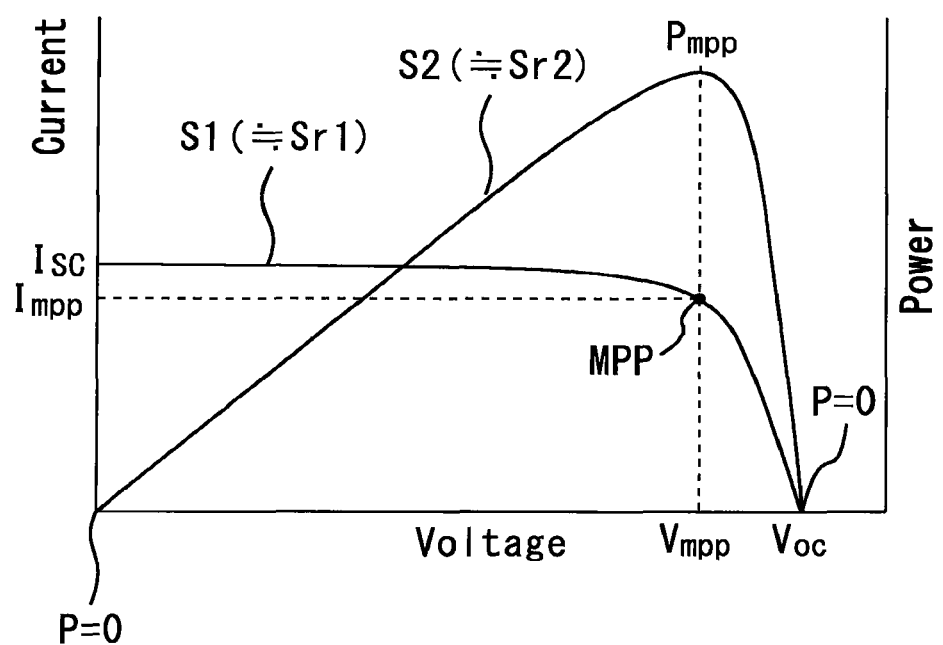
FIG. 2 is a graph illustrating an exemplary current-voltage characteristic curve simulated by the DC/DC converter system according to an embodiment.

FIG. 2 is a graph illustrating an exemplary current-voltage characteristic curve (i.e., IV curve) simulated by the DC/DC converter system 10 according to this embodiment in the first operation mode, the DC/DC converter 11 performs discharge control so as to simulate the current-voltage characteristic curve S1 of the photovoltaic array 2. FIG. 2 also illustrates a power characteristic curve (i.e., PV curve) S2. In addition, FIG. 2 illustrates a photovoltaic-cell current-voltage simulation characteristic curve Sr1 set in advance so as to simulate the current-voltage characteristic curve S1, and a photovoltaic-cell power simulation characteristic curve Sr2 set in advance so as to simulate the power characteristic curve S2.

FIG. 2 illustrates an optimal operating point Pmpp, a maximum output operating voltage Vmpp, a maximum output operating current Impp, an open-circuit voltage Voc, and a short-circuit current Isc. The optimal operating point Pmpp is the local maximum point at which the power characteristic curve S2, which represents the product of the operating voltage and the operating current of the current-voltage characteristic curve S1, becomes maximum. The maximum output operating voltage Vmpp is the operating voltage at the optimal operating point (the point MPP in FIG. 2).

The maximum output operating current Impp is the operating current at the optimal operating point. The open-circuit voltage Voc is the voltage in the open-circuit condition in which nothing, such as loads, is connected to the output terminals of the photovoltaic cells. The short-circuit current Isc is the current that flows when the output terminals of the photovoltaic cells are short-circuited.

FIG. 2 exemplarily illustrates the actual characteristic curves (S1 and S2) and the simulation characteristic curves (Sr1 and Sr2) in an overlapped manner for convenience sake. In the "simulation" according to this embodiment, the characteristic curves (S1 and S2) to serve as references and the simulation characteristic curves (Sr1 and Sr2) may have the same shape or approximately the same shape (i.e., approximate or close shapes).

The normal current-voltage characteristic curve S1 is an approximately rectangular curve having a bent portion at around the optimal operating point MPP. The power characteristic curve S2 rises linearly from a voltage of zero V toward the optimal operating point Pmpp, and abruptly falls from the optimal operating point Pmpp. The DC/DC converter 11 preferably performs DC/DC conversion control so as to simulate such normal characteristic curves as accurately as possible.

The first operation mode (i.e., PV simulation operation mode) is a mode in which the discharge output of the battery facility 9 is controlled so that the amount of discharge will change according to the photovoltaic-cell current-voltage simulation characteristic curve Sr1 that simulates the current-voltage characteristic curve S1 of the photovoltaic array 2. In this embodiment, "characteristic curve information" is stored in the converter control unit 11a of the DC/DC converter 11. The characteristic curve information is electronic data representing the photovoltaic-cell current-voltage simulation characteristic curve Sr1. As the converter control unit 11a generates a command value based on the characteristic curve information, the output value of the DC/DC converter 11 can be allowed to approximate to the photovoltaic-cell current-voltage simulation characteristic curve Sr1. The characteristic curve information may be stored in a nonvolatile memory of the converter control unit 11a in the form of numerical value data, such as a table, or mathematical formula data, such as an approximate function, for example.

The first operation mode can be implemented on the DC/DC converter 11 in the following manner, for example. The converter control unit 11a executes a command value setting logic for generating a command value based on the aforementioned characteristic curve information. The converter control unit 11a also has incorporated therein a discharge control logic for executing discharge control of the battery facility 9 according to the command value. The command value setting logic and the discharge control logic may be incorporated in the nonvolatile memory of the converter control unit 11a in the form of a software program or incorporated in part of the converter control unit 11a as a processing circuit in a hardware manner.

A specific example of the discharge control logic implemented in the first operation mode in the photovoltaic system of FIG. 1 will be described. In step S101, the DC/DC converter 11 performs DC/DC conversion control based on a command value and each of the measured values of the first current-voltage sensor and the second current-voltage sensor. The command value is set in advance on the premise of obtaining an output power capacity equal to that of the photovoltaic array 2. The command value may be a power command value or a voltage command value, for example. The DC/DC converter 11 executes switching control according to the command value that is based on the characteristic curve information as described above. Consequently, the DC/DC converter 11 controls an output voltage and an output current that are output to the connection node Px so that the current-voltage characteristics at the connection node Pie become approximate to the current-voltage characteristic curve of the photovoltaic array 2.

Next, in step S102, the power converter device 3 executes MPPT control based on the current and the voltage at the connection node Px. At this time, the current and the voltage at the connection node Px as seen from the power converter device 3 are equal to those of the photovoltaic panel current-voltage characteristic curve (S1 in FIG. 2). Thus, the power converter device 3 can continue the power conversion control without changing or adjusting the MPPT control or capturing of the sensor information, for example.

It should be noted that the photovoltaic-cell current-voltage simulation characteristic curve Sr1, the photovoltaic-cell power simulation characteristic curve Sr2, and the characteristic curve information on such curves according to this embodiment may be determined considering the following point. Photovoltaic cells come in various materials and structures, such as single-crystalline or polycrystalline silicon photovoltaic cells, amorphous silicon photovoltaic cells, and compound photovoltaic cells. In addition, the current-voltage characteristic curves of the photovoltaic cells may have different shapes depending on the measurement state. The measurement state includes temperature, spectral distribution, and irradiance of the photovoltaic cells.

As a specific example, the aforementioned characteristic curve information may be determined based on the actual measurement value of a current-voltage characteristic curve, which has been obtained by measuring a photovoltaic panel having the same type of material and structure as that of the actual photovoltaic array 2, under a reference condition determined by a specific standard. As the specific standard, JIS standards are known, for example. The reference condition of the JIS standards is defined as a condition in which the temperature of the photovoltaic cells is 25° C., the spectral distribution is a reference solar radiation, and irradiance is 1000 W/m$^2$. Thus, such a condition may be used.

Alternatively, as another specific example, a plurality of pieces of characteristic curve information corresponding to a plurality of photovoltaic-cell current-voltage simulation characteristic curves Sr1 may be stored in the DC/DC converter 11, for example. In such a case, the converter control unit 11a may be configured to select a particular one of the plurality of pieces of characteristic curve information according to a predetermined rule. In such a case, the command value setting logic may calculate a command value using the thus selected characteristic curve information, and then the first operation mode may be executed according to the calculated command value.

When the photovoltaic array 2 is not generating power, the DC/DC converter 11 preferably performs discharge control so as to allow the amount of discharge of the battery facility 9 to coincide with the power generation amount of the photovoltaic array 2 during its power generation peak time. The power converter device 3 preferably performs MPPT control so as to achieve a maximum power generation amount concurrently with the operation of the DC/DC converter 11 in the first operation mode.

Preferably, controlling a DC voltage so that it becomes close to the lower limit of the MPPT range can increase efficiency. According to the first operation mode, it appears as if another photovoltaic array has been added and is always generating power as seen from the side of the photovoltaic array 2 and the power converter device 3. Thus, the power converter device 3 can perform MPPT control as usual.

(Second Operation Mode and Third Operation Mode)

Figure 3:
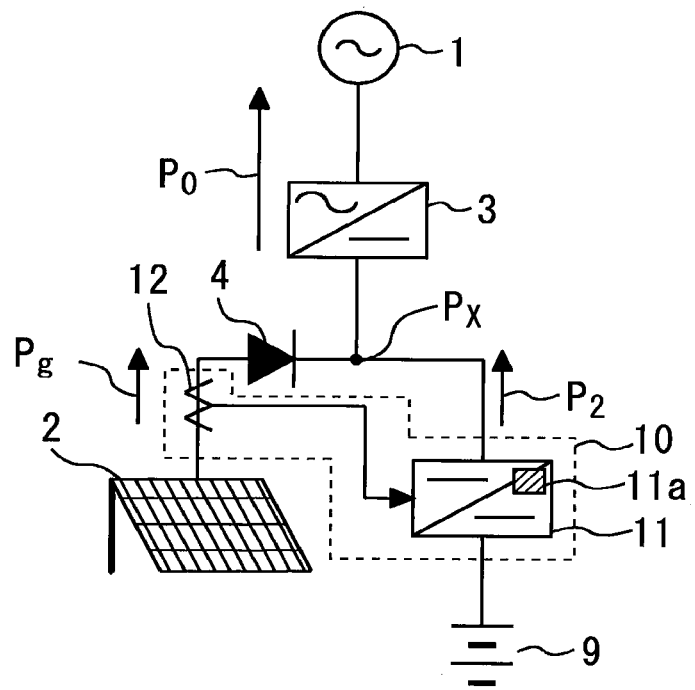
FIG. 3 is a diagram illustrating the configurations of the DC/DC converter system and the photovoltaic system according to an embodiment.
Figure 4:
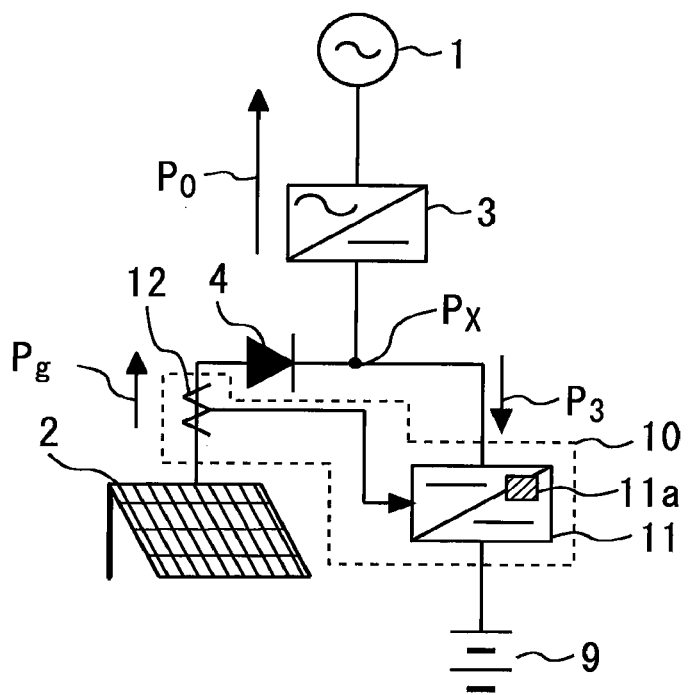
FIG. 4 is a diagram illustrating the configurations of the DC/DC converter system and the photovoltaic system according to an embodiment.

FIGS. 3 and 4 are diagrams each illustrating the configurations of the DC/DC converter system 10 and the photovoltaic system according to this embodiment. The second operation mode and the third operation mode according to this embodiment will be described with reference to FIGS. 3 and 4. Each of the second operation mode and the third operation mode is an operation mode in which the photovoltaic array 2 and the battery facility 9 are operated in parallel. FIGS. 3 and 4 differ from FIG. 1 in that generated power Pg is generated through photovoltaic power generation.

When both the photovoltaic array 2 and the battery facility 9 are generating power, the DC/DC converter 11 operates in the second operation mode. In the second operation mode, power is discharged in the direction of the arrow P2 in FIG. 3. During the second operation mode, MPPT control is performed as usual on the side of the photovoltaic array 2 and the power converter device 3, and the DC/DC converter 11 compensates for a deficiency on the side of the photovoltaic array 2 by performing discharge control.

The operation in the second operation mode includes a discharge operation of increasing a potential at the connection node Px. Specifically, in the discharge operation mode, the DC/DC converter 11 performs a discharge operation so as to increase a potential at the connection node Px when a voltage at the connection node Px is lower than or equal to a predetermined voltage Vth. The inverter of the power converter device 3 controls a target voltage for MPPT control so that desired constant DC power can be discharged from the battery facility 9.

The third operation mode is a mode in which the photovoltaic array 2 is generating power and the battery facility 9 is charged. In the third operation mode, power is taken in in the direction of the arrow P3 in FIG. 4. The control performed in the third operation mode is the same as that in the second operation mode except that the direction of power flow between the battery facility 9 and the DC/DC converter 11 is opposite. The third operation mode includes a mode in which a voltage at the connection node Px is converted so as to charge the storage battery body of the battery facility 9. That is, in the third operation mode, a voltage at the connection node Px is converted so as to charge the battery facility 9 when the voltage at the connection node Px is higher than the predetermined voltage Vth.

According to this embodiment, the DC/DC converter 11 operates in the first operation mode (i.e., PV simulation operation mode) upon detecting that the photovoltaic array 2 is not generating power from a current value sensed with the current sensor 12. Meanwhile, upon detecting that the photovoltaic array 2 is generating power from a current value sensed with the current sensor 12, the DC/DC converter 11 selectively switches mode between the second operation mode (i.e., discharge operation mode) and the third operation mode (i.e., charge operation mode) according to the magnitude relationship between a voltage at the connection node Px and the predetermined voltage Vth.

Accordingly, the first operation mode in which the photovoltaic array 2 is simulated can be used when the photovoltaic array 2 is not generating power. Meanwhile, when the photovoltaic array 2 is generating power, it is possible to selectively use the second operation mode in which a discharge operation is performed to compensate for a deficiency in the power generation amount or the third operation mode in which the battery facility 9 is charged if the power generation amount is sufficient.

According to this embodiment, the power converter device 3 performs maximum power point tracking (MPPT) control when the DC/DC converter 11 executes the first operation mode, the second operation mode, or the third operation mode. MPPT control of the power converter device 3 is not disturbed in each of the first operation mode to the third operation mode. Thus, the power converter device 3 can seamlessly perform MPPT control.

According to this embodiment, in the first operation mode, a voltage and a current at an operating point around the lower limit of the MPPT range in the MPPT control of the power converter device 3 are output. Controlling a DC voltage at around the lower limit of the MPPT range can increase efficiency.

As described above, according to this embodiment, the control mode of the DC/DC converter 11 can be switched according to the power generation status of the photovoltaic array 2 obtained from the current sensor 12. This embodiment is advantageous in that there is no need for complex design changes to hardware or software on the side of the photovoltaic array 2 or the power converter device 3 including a higher-order system. Since a communication line between the power converter device 3 and the DC/DC converter 11 can be omitted, and further, since design changes are not needed for the control system of the power converter device 3, the DC/DC converter 11 can be easily attached later, which is advantageous.

A variation of the DC/DC converter system 10 according to this embodiment may be provided by omitting the first operation mode from the control to be performed by the DC/DC converter 11. In such a case, the DC/DC converter 11 according to a first variation may be connected to the battery facility 9 and to the connection node Px between the cathode of the reverse-current blocking diode and the power converter device 3, be configured to convert first DC power output from the battery facility 9 into second DC power and output it to the connection node Px, and include a discharge operation mode in which a discharge operation is performed so as to increase a potential at the connection node Px when a voltage at the connection node Px is lower than or equal to a predetermined voltage.

Alternatively, the DC/DC converter 11 according to a second variation may be connected to the battery facility 9 and to the connection node Px between the cathode of the reverse-current blocking diode and the power converter device 3, be configured to convert first DC power output from the battery facility 9 into second DC power and output it to the connection node Px, and include a charge operation mode in which a voltage at the connection node Px is converted so as to charge the battery facility 9 when the voltage at the connection node Px is higher than the predetermined voltage.

As illustrated in FIG. 2, since the current-voltage characteristic curve S1 is an "approximately rectangular" graph, the photovoltaic-cell current-voltage simulation characteristic curve Sr1 may also be set to have an approximately rectangular shape. The approximately rectangular shape may be broadly divided into three sections, for example. A first section is a section in which Isc is kept at a substantially constant value with an increase in voltage in the low voltage range of from zero V as illustrated in FIG. 2. A second section is a section in which the current decreases in a gentle projecting curve with an increase in voltage when the voltage has increased from that in the first section, and can be defined as a predetermined section around $V_{mpp}$ in FIG. 2. A third section is a section in which the voltage further increases from that in the second section to reach a constant voltage so that the current abruptly falls. The command value setting logic of the converter control unit 11a may be configured to generate individual command values for at least such three divided sections. For example, the command value setting logic may be configured as a plurality of setting logics for generating command values so as to individually simulate the respective first to third sections of the aforementioned current-voltage characteristic curve S1 in FIG. 2, and the setting logic may be switched among such a plurality of setting logics.

As a variation of this embodiment, a variation of an approximate shape of the photovoltaic-cell current-voltage simulation characteristic curve Sr1 that is allowed to approximate to the current-voltage characteristic curve S1 will be described. As illustrated in FIG. 2, the current-voltage characteristic curve S1 generally has a constant value in the low-voltage region, and abruptly falls from Vmpp. The current-voltage characteristic curve S1, the current axis (the ordinate axis of FIG. 2), and the voltage axis (the abscissa axis of FIG. 2) form an approximately rectangular shape. Herein, the variation of the photovoltaic-cell current-voltage simulation characteristic curve Sr1 may be any one of a semi-trapezoidal graph, a first approximately trapezoidal graph, a second approximately trapezoidal graph, a first approximately rectangular graph, or a second approximately rectangular graph, for example. The semi-trapezoidal graph is a trapezoidal line graph having an upper base and a leg in which the corner formed by the upper base and the leg corresponds to the MPP point. The first approximately trapezoidal graph is a graph obtained by obliquely chamfering a corner corresponding to the MPP point of the aforementioned semi-trapezoidal graph once or a plurality of times. The second approximately trapezoidal graph is a graph obtained by rounding the corner corresponding to the MPP point of the aforementioned semi-trapezoidal graph. The first approximately rectangular graph is a graph obtained by obliquely chamfering a corner corresponding to the MPP point of a right-angle line graph, which includes a long side parallel with the voltage axis and a short axis parallel with the current axis, once or a plurality of times. The second approximately rectangular graph is a graph obtained by rounding the corner corresponding to the MPP point of the aforementioned right-angle line graph.

Meanwhile, a variation of the photovoltaic-cell power simulation characteristic curve Sr2 will be described. The power characteristic curve S2 is similar to a triangle (more specifically, an acute triangle) having the voltage axis (i.e., the abscissa axis of FIG. 2) as a base where the apex with respect to the base corresponds to Pmpp. Herein, the variation of the photovoltaic-cell power simulation characteristic curve Sr2 may be any one of an acute triangle graph having Pmpp as the apex, a first approximately triangle graph obtained by obliquely or horizontally chamfering a corner corresponding to Pmpp once or a plurality of times, or a second approximately triangle graph having a rounded corner corresponding to Pmpp.

As a variation, the characteristic curve information stored in the converter control unit 11a may include not only the photovoltaic-cell current-voltage simulation characteristic curve Sr1 but also the photovoltaic-cell power simulation characteristic curve Sr2 (see FIG. 2). When the converter control unit 11a performs control based on a power command value, the power command value may be generated from the characteristic curve information so as to implement the photovoltaic-cell power simulation characteristic curve Sr2.

In the first operation mode, the output characteristics of the battery facility 9 determine the input current and the input voltage of the DC/DC converter 11. Thus, the output characteristics of the storage battery body of the battery facility 9 may be included in the calculation for setting a command value. As a variation, "one or more pieces of command value data generated from the characteristic curve information" may be stored in the converter control unit 11a instead of the characteristic curve information. In such a variation, a plurality of pieces of predetermined command value data may be stored and in such a case, the converter control unit 11a may be configured to select a particular one of the plurality of pieces of command value data according to a predetermined rule. Even when only the command value data is stored in the converter control unit 11a as in such a variation, it is possible to allow the output characteristics of the DC/DC converter 11 to approximate to the output characteristics of the photovoltaic array 2 by generating the command value data based on the photovoltaic-cell current-voltage simulation characteristic curve Sr1 or the photovoltaic-cell power simulation characteristic curve Sr2.

REFERENCE SIGNS LIST

1 Power system
2 Photovoltaic array

3 Power converter device
4 Reverse-current blocking diode
9 Battery facility
10 DC/DC converter system
11 DC/DC converter
12 Current sensor
Px Connection node
S1 Current-voltage characteristic curve
S2 Power characteristic curve
Sr1 Photovoltaic-cell current-voltage simulation characteristic curve
Sr2 Photovoltaic-cell power simulation characteristic curve
P0 Site resultant power
Pg Generated power

The invention claimed is:

1. A DC/DC converter system comprising:
a current sensor configured to sense a current to flow from a photovoltaic panel to a power converter device; and
a DC/DC converter device provided between a battery facility and the power converter device and configured to convert first DC power output from the battery facility into second DC power and output the second DC power to the power converter device, the DC/DC converter device including a first operation mode in which, when it is detected that the photovoltaic panel is not generating power from a current value sensed with the current sensor, the second DC power is generated so as to allow an output current and an output voltage to change according to a predetermined photovoltaic-cell current-voltage simulation characteristic curve, the DC/DC converter device storing characteristic curve information representing the predetermined photovoltaic-cell current-voltage simulation characteristic curve and a photovoltaic-cell power simulation characteristic curve, and generating a command value based on the characteristic curve information, which represents both the predetermined photovoltaic-cell current-voltage simulation characteristic curve and the photovoltaic-cell power simulation characteristic curve, to generate the second DC power,
wherein:
the DC/DC converter device includes a second operation mode in which a boost operation of increasing a potential at a connection node between the power converter device and the DC/DC converter device is performed, and
the DC/DC converter device is configured to, when it is detected that the photovoltaic panel is generating power from a current value sensed with the current sensor, compensate for a deficiency in a power generation amount of the photovoltaic panel by executing the second operation mode instead of the first operation mode.

2. The DC/DC converter system according to claim 1, wherein
the battery facility is chargeable and dischargeable,
the DC/DC converter device includes a third operation mode in which a voltage at the connection node is converted so as to charge the battery facility, and
the DC/DC converter device is configured to selectively switch mode between the second operation mode and the third operation mode according to a voltage at the connection node upon detecting that the photovoltaic panel is generating power from a current value sensed with the current sensor.

3. The DC/DC converter system according to claim 2, wherein the power converter device seamlessly performs maximum power point tracking (MPPT) control when the DC/DC converter device executes the first operation mode, the second operation mode, or the third operation mode.

4. A DC/DC converter system, comprising:
a current sensor configured to sense a current to flow from a photovoltaic panel to a power converter device; and
a DC/DC converter device provided between a battery facility and the power converter device and configured to convert first DC power output from the battery facility into second DC power and output the second DC power to the power converter device, the DC/DC converter device including a first operation mode in which, when it is detected that the photovoltaic panel is not generating power from a current value sensed with the current sensor, the second DC power is generated so as to allow an output current and an output voltage to change according to a predetermined photovoltaic-cell current-voltage simulation characteristic curve, the DC/DC converter device storing characteristic curve information representing the predetermined photovoltaic-cell current-voltage simulation characteristic curve and a photovoltaic-cell power simulation characteristic curve, and generating a command value based on the characteristic curve information, which represents both the predetermined photovoltaic-cell current-voltage simulation characteristic curve and the photovoltaic-cell power simulation characteristic curve, to generate the second DC power,
wherein in the first operation mode, a voltage and a current at a predetermined operating point around a lower limit of a MPPT range in the MPPT control of the power converter device are output.

5. A photovoltaic system comprising:
a photovoltaic panel;
a reverse-current blocking diode that receives at an anode DC power from the photovoltaic panel;
a power converter device that receives the DC power from a cathode of the reverse-current blocking diode;
a current sensor configured to sense a current to flow from the photovoltaic panel to the power converter device via the reverse-current blocking diode;
a battery facility; and
a DC/DC converter device connected to a connection node between the cathode of the reverse-current blocking diode and the power converter device, the DC/DC converter device being configured to convert first DC power output from the battery facility into second DC power and output the second DC power to the connection node, the DC/DC converter device including a first operation mode in which, when it is detected that the photovoltaic panel is not generating power from a current value sensed with the current sensor, the second DC power is generated so as to allow an output current and an output voltage to change according a predetermined photovoltaic-cell current-voltage simulation characteristic curve, the DC/DC converter device storing characteristic curve information representing the predetermined photovoltaic-cell current-voltage simulation characteristic curve and a photovoltaic-cell power simulation characteristic curve, and generating a command value based on the characteristic curve information, which represents both the predetermined photovoltaic-cell current-voltage simulation characteristic curve and the photovoltaic-cell power simulation characteristic curve, to generate the second DC power,
wherein:

the DC/DC converter device includes a second operation mode in which a boost operation of increasing a potential at a connection node between the power converter device and the DC/DC converter device is perforated, and the DC/DC converter device is configured to, when it is detected that the photovoltaic panel is generating power from a current value sensed with the current sensor, compensate for a deficiency in a power generation amount of the photovoltaic panel by executing the second operation mode instead of the first operation mode.

6. The photovoltaic system according to claim 5, wherein the power converter device and the DC/DC converter device are configured to individually execute control operations without communicating with each other.

7. The photovoltaic system according to claim 5, wherein no other DC/DC converter devices are provided in a series circuit between the photovoltaic panel and the power converter device.

* * * * *